United States Patent
Kim et al.

(10) Patent No.: US 12,059,982 B2
(45) Date of Patent: Aug. 13, 2024

(54) SEAT POSITION ADJUSTING DEVICE FOR VEHICLE

(71) Applicants: Hyundai Motor Company, Seoul (KR); Kia Corporation, Seoul (KR)

(72) Inventors: Bong Ku Kim, Seoul (KR); Sang Do Park, Gyeonggi-do (KR); Deok Soo Lim, Gyeonggi-do (KR); Sang Soo Lee, Gyeonggi-do (KR); Chan Ho Jung, Gyeonggi-do (KR); Hyun Ko, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 83 days.

(21) Appl. No.: 17/949,451

(22) Filed: Sep. 21, 2022

(65) Prior Publication Data

US 2023/0091146 A1 Mar. 23, 2023

(30) Foreign Application Priority Data

Sep. 23, 2021 (KR) .......................... 10-2021-0125499

(51) Int. Cl.
*B60N 2/12* (2006.01)
*B60N 2/04* (2006.01)
(Continued)

(52) U.S. Cl.
CPC .............. *B60N 2/12* (2013.01); *B60N 2/045* (2013.01); *B60N 2/10* (2013.01); *B60N 2/1625* (2013.01); *B60N 2/68* (2013.01)

(58) Field of Classification Search
CPC ........... B60N 2/12; B60N 2/1625; B60N 2/10
See application file for complete search history.

(56) References Cited

U.S. PATENT DOCUMENTS

| | | | | |
|---|---|---|---|---|
| 5,683,140 A | * | 11/1997 | Roth | ........................ B60N 2/12 |
| | | | | 297/341 |
| 7,316,441 B2 | * | 1/2008 | Iwatani | .................. B60N 2/245 |
| | | | | 297/344.13 |

(Continued)

FOREIGN PATENT DOCUMENTS

| | | | | |
|---|---|---|---|---|
| CN | 109050355 A | * | 12/2018 | ............... B60N 2/10 |
| CN | 115551739 A | * | 12/2022 | ............... B60N 2/01 |

(Continued)

*Primary Examiner* — Timothy J Brindley
(74) *Attorney, Agent, or Firm* — Fox Rothschild LLP

(57) ABSTRACT

A seat position adjusting device for a vehicle may integrate a seatback reclining mechanism and a mechanism for realizing a comfort relaxation posture into one simplified mechanism. The seat position adjusting device includes: a seatback frame and a seat cushion frame connected to each other at a predetermined seating angle; a fixed rail mounted on a bottom surface of a rear end portion of the seat cushion frame to be inclined upward and forward; a moving rail mounted to the fixed rail to be movable forward and backward; a pair of support frames mounted on a floor panel; a front link hinge-coupled between a bottom surface of a front end portion of the seat cushion frame and a front end portion of an associated one of the support frames; and one or more support links hinge-coupled between the moving rail and the associated one of the support frames.

10 Claims, 7 Drawing Sheets

(51) Int. Cl.
  *B60N 2/10* (2006.01)
  *B60N 2/16* (2006.01)
  *B60N 2/68* (2006.01)

(56) References Cited

U.S. PATENT DOCUMENTS

| | | | |
|---|---|---|---|
| 8,585,145 B2 * | 11/2013 | Nock | B60N 2/12 |
| | | | 297/378.12 |
| 8,662,587 B2 * | 3/2014 | Ngiau | B60N 2/12 |
| | | | 297/344.21 |
| 11,439,240 B2 * | 9/2022 | Tsai | B60N 2/01 |

FOREIGN PATENT DOCUMENTS

| | | | | | |
|---|---|---|---|---|---|
| CN | 116101142 | A | * | 5/2023 | |
| CZ | 283854 | B6 | * | 6/1998 | ............. B60N 2/12 |
| EP | 3895934 | A4 | * | 10/2021 | ........... B60N 2/0232 |
| JP | 4501581 | B2 | | 7/2010 | |
| JP | 5961322 | B2 | | 8/2016 | |
| JP | 6378564 | B2 | | 8/2018 | |
| KR | 101534908 | B1 | | 7/2015 | |
| KR | 102540545 | B1 | * | 6/2023 | |
| WO | WO-2018215570 | A1 | * | 11/2018 | ............. B60N 2/015 |

* cited by examiner

SEAT POSITION ADJUSTING DEVICE FOR VEHICLE

CROSS REFERENCE TO RELATED APPLICATION

The present application claims under 35 U.S.C. § 119(a) the benefit of Korean Patent Application No. 10-2021-0125499, filed Sep. 23, 2021, the entire contents of which is incorporated by reference herein.

BACKGROUND

1. Technical Field

The present disclosure relates to a seat position adjusting device for a vehicle, more particularly, to the seat position adjusting device having a simplified structure of a reclining and relaxation mechanism of a seat mounted on a purpose built vehicle (PBV).

2. Description of the Related Art

In general, a seat of a vehicle is manufactured to have a structure that includes a seat cushion for sitting, a seatback for supporting an occupant's back, and a headrest to support the neck and head. In addition, various mechanisms for adjusting the seat position may be applied to the seat so that a seat position can be freely implemented according to body shape and seating arrangement of the occupant.

For example, the various mechanisms for adjusting the seat position may include a mechanism for adjusting a seat height, a mechanism for implementing a comfort relaxation posture, a mechanism for reclining a seatback, and the like.

However, the various mechanisms for adjusting the seat position are complicated and have disadvantages in that the number of parts is increased, and problems such as an increase in assembly time, cost, and vehicle weight are caused by the additional parts.

Accordingly, a simplified mechanism for adjusting the seat position is required.

In particular, the purpose built vehicle (PBV), a type of autonomous vehicle, is manufactured for various purposes, and may serve as a residential or rest area, a mobile warehouse, a logistics delivery mobility, a mobile hospital, and a food truck, so interior space for mounting seats is limited. It is preferable to apply the mechanism for adjusting the seat position for the PBV in a simplified structure suitable for the purpose.

Moreover, when multiple seats for multiple occupants are mounted in a narrow interior space of the PBV, there is a limit to applying the seatback reclining mechanism as a space behind the seatback cannot be secured. It is difficult to adjust a tilting angle of the seat cushion in conjunction with backward reclining of the seatback to realize a comfort relaxation posture and to set a strength of a seat frame to a level that can withstand an operating load of a belt-in-seat (BIS).

SUMMARY

An objective of the present disclosure is to provide a seat position adjusting device for a vehicle that integrates a seatback reclining mechanism and a mechanism for realizing a comfort relaxation posture into a single structure thereby achieving structural simplification as well as overcoming such restrictions as: a space behind a seatback must be secured for rear reclining of the seatback; it is difficult to change an angle of a seat cushion for the realization of a comfort relaxation posture; a strength of the seat frame must satisfy a level that can withstand an operating load of the belt-in-seat (BIS).

In order to achieve the above objective, the present disclosure provides a seat position adjusting device for a vehicle, including: a seatback frame and a seat cushion frame connected to each other at a predetermined seating angle; a fixed rail mounted on the bottom surface of the rear end portion of the seat cushion frame to be inclined upward and forward; a moving rail mounted to the fixed rail to be able to move forward and backward; a pair of support frames mounted on the floor panel; a front link hinge-coupled between the bottom surface of the front end portion of the seat cushion frame and the front end portion of the support frame; and one or more support links hinge-coupled between the moving rail and the support frame.

A support bracket may be mounted on a bottom surface of the rear end portion of the seat cushion frame to be inclined upward and forward, and the fixed rail may be mounted on the support bracket to be inclined upward and forward while having the same inclination.

A first hinge bracket in which an upper end portion of a front link is mounted by a first hinge pin may be formed on a bottom surface of a front end portion of the seat cushion frame, and a second hinge bracket in which a second hinge pin fastens a bottom end portion of the front link may be formed on a front end portion of the support frame.

The support link may include: a middle link hinge-coupled between the front end portion of the moving rail and the middle portion of the support frame; and a rear link hinge-coupled between the rear end portion of the moving rail and the rear end portion of the support frame.

A third hinge bracket and a fourth hinge bracket to which the bottom end portion of the middle link and the bottom end portion of the rear link are mounted by hinge pins may be formed on the middle and rear end portions of the support frame, respectively.

The moving rail, the middle link, the rear link, and the support frame may be adopted to be four-section links connected to each other.

In addition, the fixed rail and the moving rail may be mounted with manual operation mechanisms for locking and unlocking operations, and forward/backward motion of the moving rail.

The manual operation mechanism may include: a hinge bracket mounted on the moving rail; a locking member rotatably mounted on the hinge bracket to be selectively inserted into one of a plurality of locking holes formed in the fixed rail so as to lock the moving rail; and a manual operation bar of a predetermined length connected to the locking member to rotate the locking member in a locking or unlocking direction.

Accordingly, when the moving rail is moved forward of the fixed rail, the support link may rotate to be inclined forward, and at the same time, the seat cushion frame and the seatback frame may be rotated to be inclined backward around a hinge fastening point with the front link.

On the other hand, when the moving rail is moved to the rear of the fixed rail, the support link may be rotated to be inclined to the backward, and at the same time, the seat cushion frame and the seatback frame may be rotated to erect forward around the hinge fastening point with the front link.

The present disclosure may provide the following effects.

First, a seat capable of implementing a comfort relaxation posture through seatback reclining and seat cushion tilting can be easily mounted in a limited narrow interior space of a PBV.

Second, cost reduction and weight reduction may be realized by simplifying the mechanisms for realizing a comfort relaxation posture through seatback reclining and seat cushion tilting and by reducing the number of parts.

Third, the fixed rail and the moving rail connected to the seat cushion frame and a plurality of links connected to the moving rail provide the advantage of serving as a rigid reinforcement that can withstand the operating load of the BIS.

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, preferred embodiments of the present disclosure will be described in detail with reference to the accompanying drawings.

Figure 1:
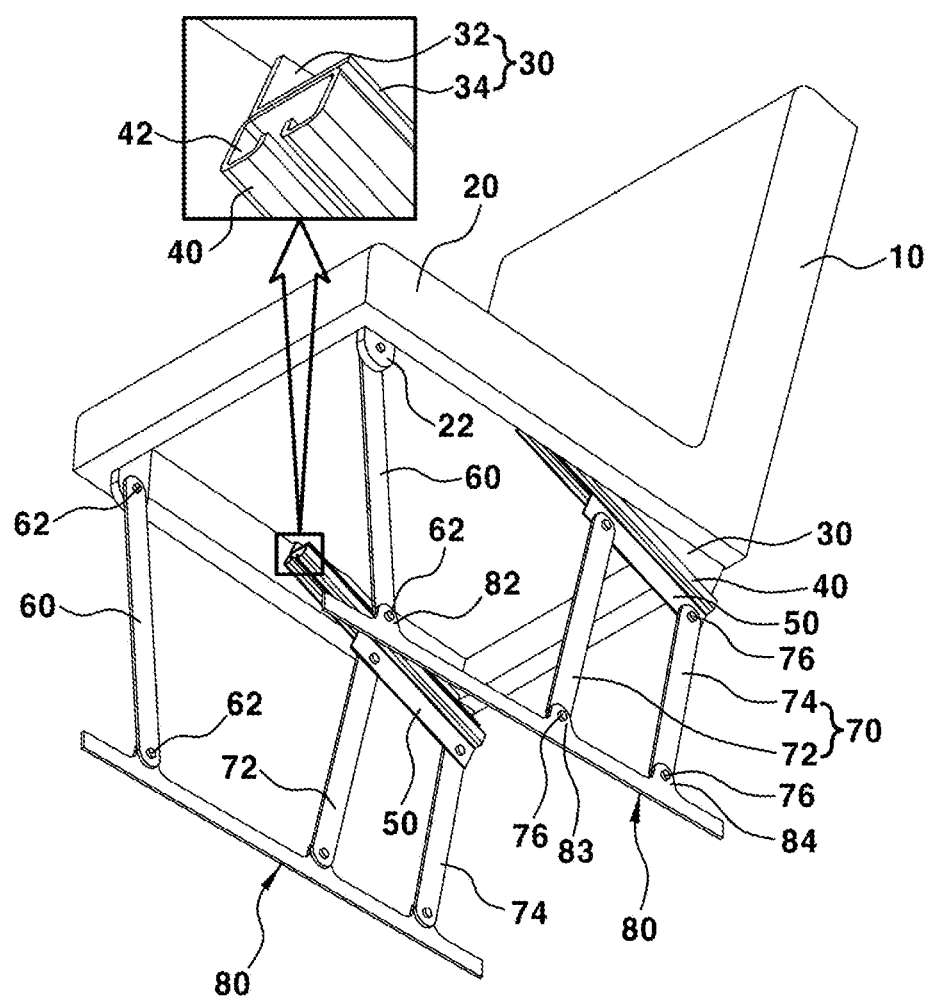
FIG. 1 is a perspective view showing a seat position adjusting device for a vehicle according to the present disclosure.
Figure 2:
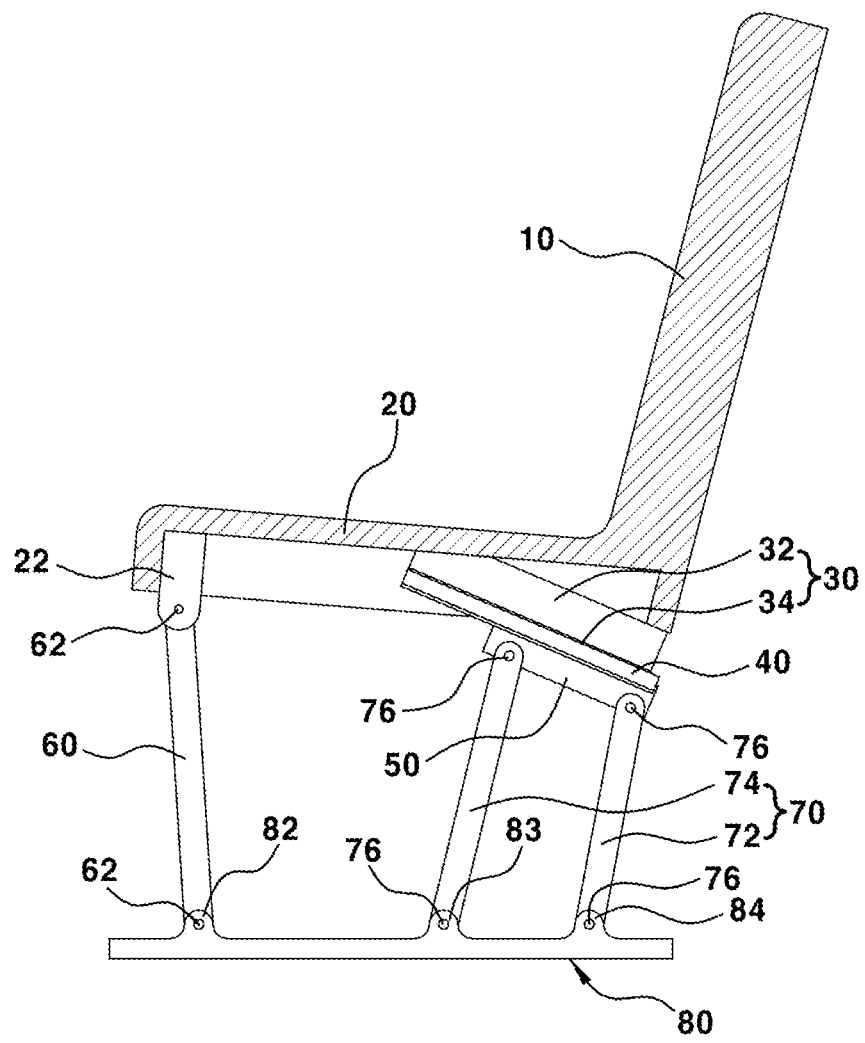
FIGS. 2 and 3 are side views showing the before and after operation of the seat position adjusting device for a vehicle according to the present disclosure, respectively.
Figure 3:
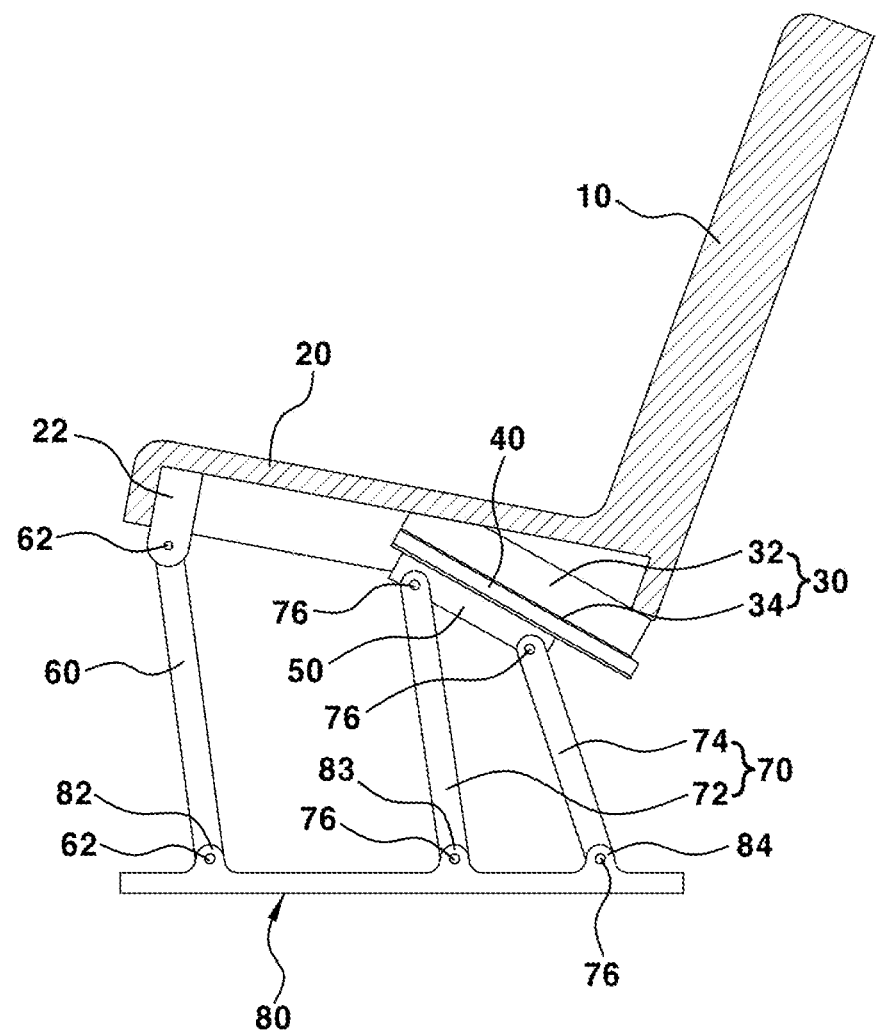

FIG. 1 is a perspective view showing a seat position adjusting device for a vehicle according to the present disclosure, and FIGS. 2 and 3 are side views showing the before and after operation of the seat position adjusting device for a vehicle according to the present disclosure, respectively.

As shown in FIGS. 1, 2, and 3, a seatback frame 10 and a seat cushion frame 20 are connected to each other at a predetermined seating angle.

In particular, on a bottom surface of a rear end portion of the seat cushion frame 20, a support bracket 30 provided with a vertically bent plate structure is mounted to be inclined upwardly and forwardly while having a predetermined inclination.

In particular, when a vertical plate 32 of the support bracket 30 is mounted on the bottom surface of the rear end portion of the seat cushion frame 20, a horizontal plate 34 of the support bracket 30 has a predetermined inclination and is arranged to be inclined upward and forward.

A fixed rail 40 is mounted on the support bracket 30, and is inclined upward and forward while having the same inclination as the support bracket 30.

In particular, the fixed rail 40 is mounted on the horizontal plate 34 of the support bracket 30 and is arranged to be inclined upward and forward while having the same inclination as the horizontal plate 34 of the support bracket 30.

A moving rail 50 is coupled to the fixed rail 40 to be able to move forward and backward.

For example, the fixed rail 40 is manufactured to have a structure having a slide groove 42, and the moving rail 50 is manufactured to have a structure having a slide end 52 inserted into and mounted to the slide groove 42 to be movable back and forth so that the moving rail 50 may slide back and forth along the fixed rail 40.

At this time, since the fixed rail 40 is mounted on the horizontal plate 34 of the support bracket 30 to be inclined upward and forward, the moving rail 50 coupled to the fixed rail 40 is also arranged to be inclined upward and forward while having the same inclination as the fixed rail 40.

On the other hand, on a floor panel (not shown) constituting the floor of the vehicle's interior space, a pair of support frames 80 made in the shape of a long bar are mounted side by side while forming a horizontal arrangement along the front-rear direction.

A front link 60 is hinge-coupled between the bottom surface of the front end of the seat cushion frame 20 and the front end portion of the support frame 80.

To this end, a first hinge bracket 22 to which a first hinge pin 62 fastens the upper end portion of the front link 60 is formed on the bottom surface of the front end portion of the seat cushion frame 20, and a second hinge bracket 92 to which a second hinge pin 62 fastens the bottom end portion of the front link 60 is formed at the front end portion of the support frame 80.

In addition, one or more support links 70 are connected by a hinge between the moving rail 50 and the support frame 80.

Preferably, the support link 70 may include a middle link 72 hinge-coupled between a front end portion of the moving rail 50 and a middle portion of the support frame 80, and a rear link 74 hinge-coupled between a rear end portion of the moving rail 50 and a rear end portion of the support frame 80.

To this end, a third hinge bracket 83 and a fourth hinge bracket 84 are formed at a middle end portion and a rear end portion of the support frame 80 to be rotatably mounted by a hinge pin 76 at a bottom end portion of the middle link 72 and the rear link 74, respectively.

In addition, the upper end portion of the middle link 72 and the upper end portion of the rear link 74 are rotatably mounted to the front end portion of the moving rail 50 and the middle portion of the support frame 80 by hinge pin 76, respectively.

At this time, since the moving rail 50 is arranged in an upwardly inclined state toward the forward, and the support frame 80 is arranged in a horizontal state along the front-rear direction, a middle link 72 hinge-coupled between the front end portion of the moving rail 50 and the middle end portion of the support frame 80 is applied to have a longer length than a rear link 74 hinge-coupled between the rear end portion of the moving rail 50 and the rear end portion of the support frame 80.

Accordingly, a length section of the moving rail 50, the middle link 72 hinge-coupled to the front end portion of the moving rail 50, the rear link 74 hinge-coupled to the rear end portion of the moving rail 50, and a length section between the third hinge bracket 83 to which the bottom end portion of the middle link 72 is hinge-coupled and the fourth hinge bracket 84 to which the bottom end portion of the rear link 74 is hinge-coupled among the entire length of the support frame 80 may be configured as four-section links connected to each other while forming a square shape.

Therefore, in a state in which the support frame 80 constituting the four-section links is fixed, the seat cushion frame 20 and the seatback frame 10 may be rotated at a predetermined angle by forward/backward motion of the moving rail 50 and rotation of the middle link 72 and the rear link 74.

For example, when the moving rail 50 is moved to the front end portion of the fixed rail 40, as shown in FIG. 3, the middle link 72 and the rear link 74 constituting the support link 70 may be rotated to be inclined forward, while the seat cushion frame 20 and the seatback frame 10 may be rotated to be inclined backward around a hinge coupling point with the front link 60.

In particular, when the moving rail 50 is moved to the front end portion of the fixed rail 40 arranged to be inclined upward and forward since the middle link 72, and the rear link 74 are rotated to be inclined toward the forward without a change in length, while also serving to pull the rear end portion of the seat cushion frame 20 downward, the seat cushion frame 20 and the seatback frame 10 may be rotated to be inclined backward around a hinge coupling point at which the first hinge bracket 22 of the seat cushion frame 20 and the upper end portion of the front link 60 are mounted by a hinge pin 62.

In this way, when the seat cushion frame 20 and the seatback frame 10 are rotated to be inclined backward together, by simultaneously performing a tilting operation in which the rear portion of the seat cushion frame 20 that is the buttocks support (the part where the passenger's buttocks is seated) descends and a backward reclining operation of the seatback frame 10 are simultaneously performed, thereby implementing a seat capable of comfort relaxation posture.

On the other hand, when the moving rail 50 is moved to the rear end portion of the fixed rail 40, as shown in FIG. 2, the middle link 72 and the rear link 74 constituting the support link 70 may be rotated to be inclined toward the backward, while the seat cushion frame 20 and the seatback frame 10 may be rotated to be erected toward the forward around a hinge coupling point with the front link 60.

In particular, when the moving rail 50 is moved to the rear end portion of the fixed rail 40 arranged to be inclined upward and forward since the middle link 72 and the rear link 74 are rotated to be inclined toward the backward without a change in length, while also serving to push the rear end portion of the seat cushion frame 20 upward, the seat cushion frame 20 and the seatback frame 10 may be rotated to be erected forward around a hinge coupling point at which the first hinge bracket 22 of the seat cushion frame 20 and the upper end portion of the front link 60 are mounted by a hinge pin 62.

In this way, when the seat cushion frame 20 and the seatback frame 10 are rotated to be erected forward together, a tilting operation in which the rear portion of the seat cushion frame 20 that is the buttocks support (the part where the passenger's buttocks is seated) rises and a front reclining operation of the seatback frame 10 are simultaneously performed, thereby implementing a seat capable of comfort relaxation posture.

On the other hand, considering that the seat cushion frame 20 and the seatback frame 10 may be fixed at a desired position only when the moving rail 50 is locked along the fixed rail 40, the fixed rail 40 and the moving rail 50 may be mounted with a manual operation mechanism 90 for locking and unlocking operations, and forward/backward motion of the moving rail 50.

Figure 4:
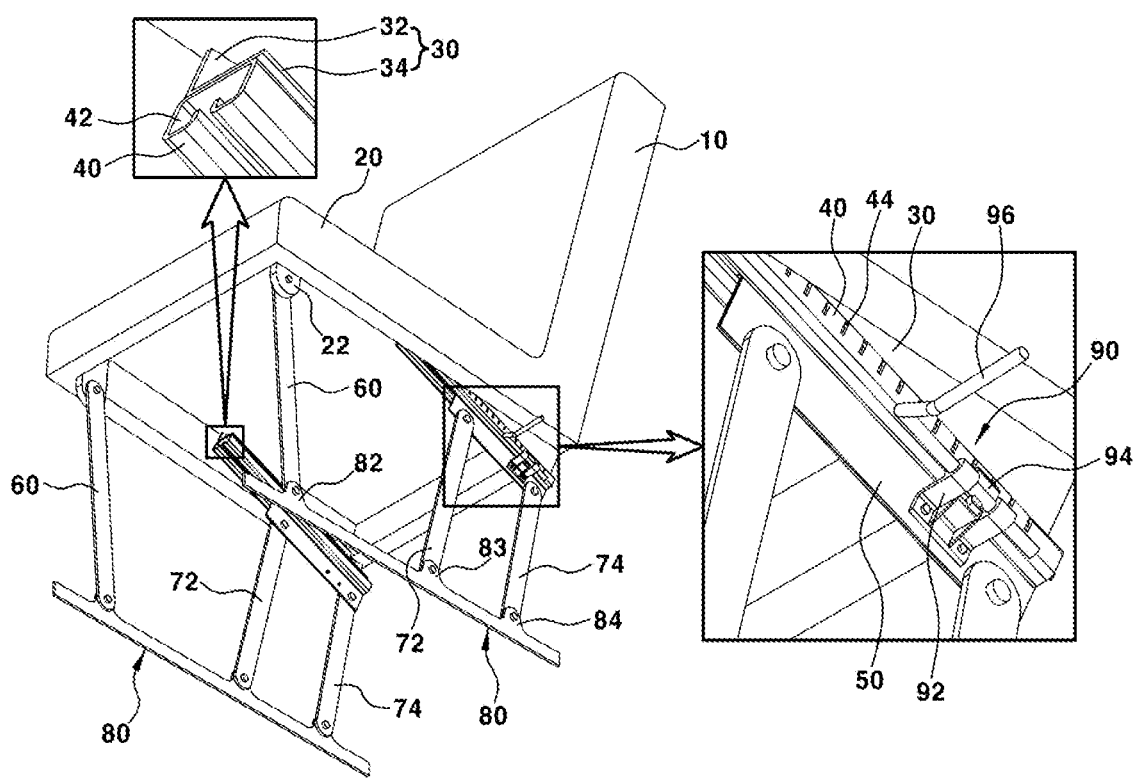
FIG. 4 is a perspective view showing a state in which the manual operation mechanism is mounted on the seat position adjusting device for a vehicle according to the present disclosure.
Figure 5:
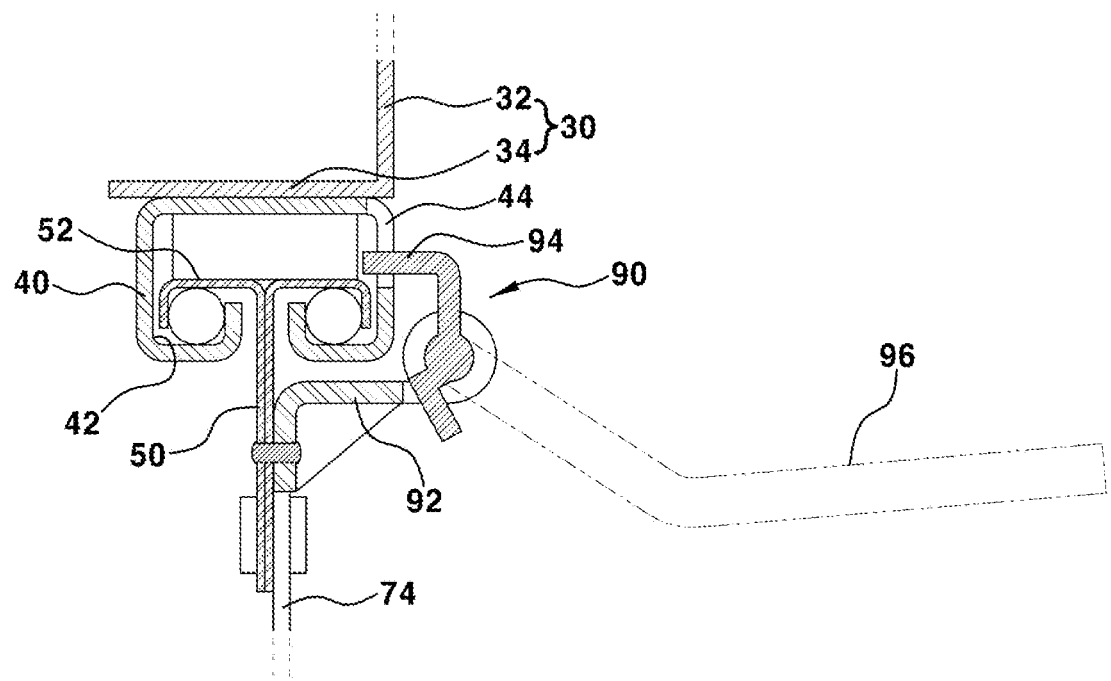
FIG. 5 is a cross-sectional view showing a locked state of the manual operation mechanism shown in FIG. 4.
Figure 6:
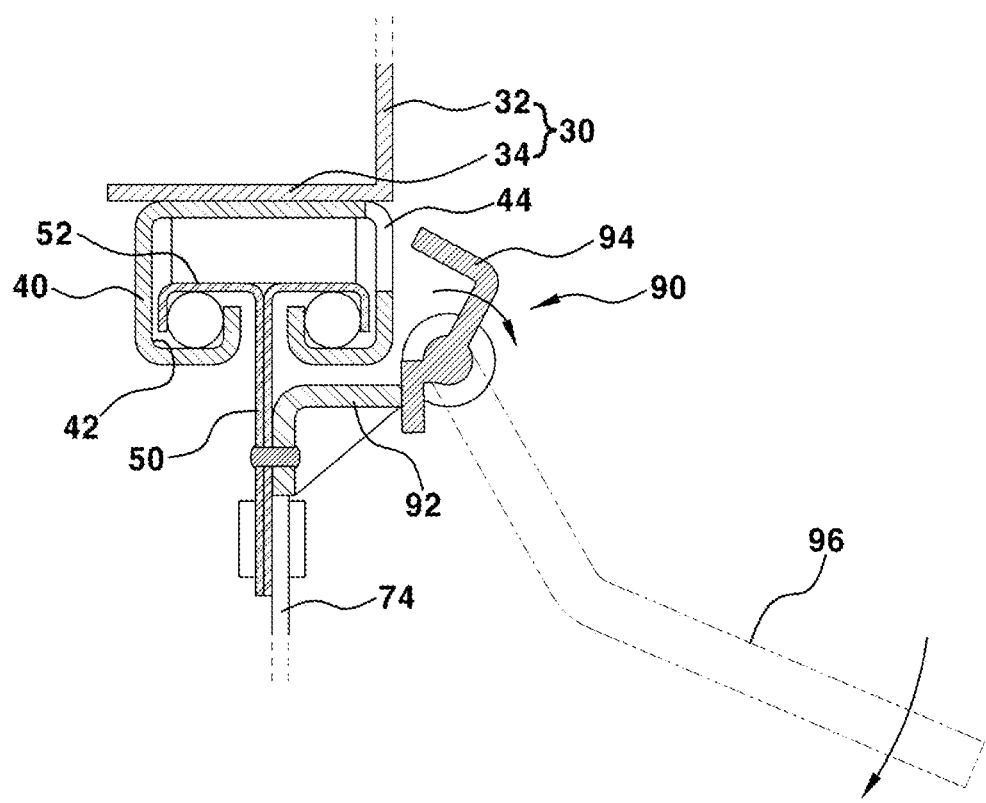
FIG. 6 is a cross-sectional view showing an unlocked state of the manual operation mechanism shown in FIG. 4.
Figure 7:
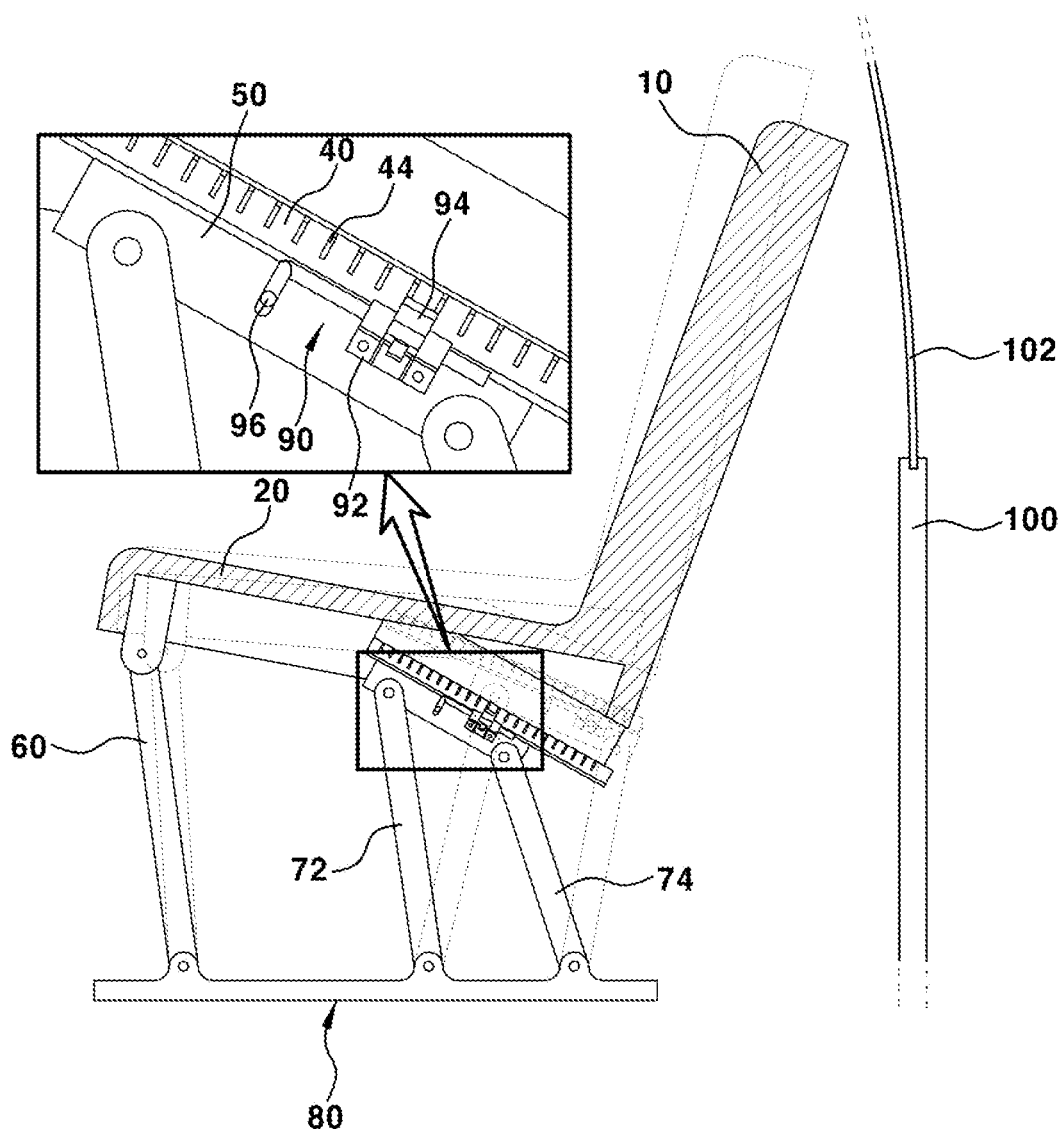
FIG. 7 is a side view showing that the seatback does not interfere with the rear glass or the tailgate when the seat position adjusting device for a vehicle according to the present disclosure is operated.

To this end, the manual operation mechanism 90 may be composed of the hinge bracket 92, which is mounted on the moving rail 50, as shown in FIGS. 4 to 6, a locking member 94 rotatably mounted on the hinge bracket 92 to be selectively inserted into one of a plurality of locking holes 44 formed in the fixed rail 40 so as to lock the moving rail 50, and a manual operation bar 96 of a predetermined length connected to the locking member 94 to rotate the locking member 94 in the locked or unlocked direction.

Alternatively, considering that the seat cushion frame 20 and the seatback frame 10 may be fixed at the desired position only when the moving rail 50 is locked along the fixed rail 40, an electric driving device such as a motor and a lead screw may be connected to the moving rail 50 instead of the manual operation mechanism.

Here, the operation flow of the seat position adjusting device for a vehicle according to the present disclosure will be described as follows.

First, when the user rotates the manual operation bar 96 in the unlocking direction, the locking member 94 comes out of the locking hole 44 of the fixed rail 40, as shown in FIG. 6.

Subsequently, when the manual operation bar 96 is pulled forward since the manual operation bar 85 is connected to the moving rail 50 through the locking member 94 and the hinge bracket 92, the moving rail 50 may be moved to the front end portion of the fixed rail 40 arranged to be inclined upward and forward.

In this way, when the moving rail 50 is moved to the front end portion of the fixed rail 40 arranged to be inclined upward and forward since the middle link 72 and the rear link 74 are rotated to be inclined toward the forward without a change in length, while also serving to pull the rear end portion of the seat cushion frame 20 downward, as shown in FIG. 3, the seat cushion frame 20 and the seatback frame 10 may be rotated to be inclined backward around a hinge coupling point at which the first hinge bracket 22 of the seat cushion frame 20 and the upper end portion of the front link 60 are mounted by a hinge pin 62.

In this way, when the seat cushion frame 20 and the seatback frame 10 are rotated to be inclined backward together, by simultaneously performing a tilting operation in which the rear portion of the seat cushion frame 20 that is the buttocks support (the part where the passenger's buttocks is seated) descends and a backward reclining operation of the seatback frame 10 are simultaneously performed, thereby implementing a seat capable of comfort relaxation posture.

At this time, when the manual operation bar 96 is rotated in the locking direction, as shown in FIG. 5, the locking member 94 is inserted into the locking hole 44 of the fixed rail 40 to be locked, so that the moving rail 50 is in a locked state, and the seat cushion frame 20 and the seatback frame 10 may be fixed while maintaining comfort relaxation posture.

In addition, during the tilting operation of descending the buttocks support of the seat cushion frame 20 and the rear reclining operation of the seatback frame 10, an interference phenomenon in which the seatback frame 10 contacts the rear glass 102 or the like of the tailgate 100 that may exist behind the seatback frame may be prevented, and as a result, a comfort relaxation posture of the seat may be easily implemented even in a not vast interior space.

On the other hand, if the user rotates the manual operation bar 96 in the unlocking direction and then pushes the manual operation bar 96 backward since the manual operation bar 85 is connected to the moving rail 50 through the locking member 94 and the hinge bracket 92, the moving rail 50 may be moved to a rear end portion of the fixed rail 40 arranged to be inclined upward and forward.

In this way, when the moving rail 50 is moved to the rear end portion of the fixed rail 40 arranged to be inclined upward and forward, the middle link 72 and the rear link 74 are rotated to be inclined backward without a change in length, while also serving to push the rear end portion of the seat cushion frame 20 upward, the seat cushion frame 20 and the seatback frame 10 may be rotated to be erected forward around a hinge coupling point at which the first hinge bracket 22 of the seat cushion frame 20 and the upper end portion of the front link 60 are mounted by a hinge pin 62.

In this way, when the seat cushion frame 20 and the seatback frame 10 are rotated to be erected forward together, a tilting operation in which the rear portion of the seat cushion frame 20 that is the buttocks support (the part where the passenger's buttocks is seated) rises and a front reclining operation of the seatback frame 10 are simultaneously performed, thereby implementing a seat capable of comfort relaxation posture.

At this time, when the manual operation bar 96 is rotated in the locking direction, the locking member 94 is inserted into the locking hole 44 of the fixed rail 40 to be locked, so that the moving rail 50 is in a locked state, and the seat cushion frame 20 and the seatback frame 10 may be fixed while maintaining the original seating posture.

As described above, the present disclosure may realize cost reduction and weight reduction by simplifying the mechanism for realizing a comfort relaxation posture through seatback reclining and seat cushion tilting and reducing the number of components. In addition, since the fixed rail 40 and the moving rail 50 connected to the seat cushion frame 20, and the middle link 72 and the rear link 74 connected to the moving rail 50 serve as rigid reinforcements to withstand the operating load of the BIS, the BIS may be easily mounted on the seat cushion frame.

Although the present disclosure has been described in detail for each embodiment above, the scope of the present disclosure is not limited to each embodiment described above, and various modifications and improvements of those skilled in the art using the basic concept of the present disclosure defined in the following claims will also be included.

What is claimed is:

1. A seat position adjusting device for a vehicle, the seat position adjusting device comprising:
   a seatback frame and a seat cushion frame connected to each other at a predetermined seating angle;
   a fixed rail mounted on a bottom surface of a rear end portion of the seat cushion frame to be inclined upward and forward relative to the seat cushion frame;
   a moving rail mounted to the fixed rail to be movable forward and backward;
   a pair of support frames mounted on a floor panel;
   a front link hinge-coupled between a bottom surface of a front end portion of the seat cushion frame and a front end portion of an associated one of the support frames; and
   one or more support links hinge-coupled between the moving rail and the associated one of the support frames.

2. The seat position adjusting device of claim 1, wherein a support bracket is mounted on the bottom surface of the rear end portion of the seat cushion frame to be inclined upward and forward, and the fixed rail is mounted on the support bracket to be inclined upward and forward while having the same inclination.

3. The seat position adjusting device of claim 1, wherein a first hinge bracket to which an upper end portion of the front link is mounted by a first hinge pin is formed on the bottom surface of the front end portion of the seat cushion frame, and a second hinge bracket to which a second hinge pin fastens a bottom end portion of the front link is provided on the front end portion of the associated one of the support frames.

4. The seat position adjusting device of claim 1, wherein the support links comprise:
   a middle link hinge-coupled between a front end portion of the moving rail and a middle portion of the associated one of the support frames; and
   a rear link hinge-coupled between a rear end portion of the moving rail and a rear end portion of the associated one of the support frames.

5. The seat position adjusting device of claim 4, wherein a third hinge bracket and a fourth hinge bracket to which a bottom end portion of the middle link and a bottom end portion of the rear link are mounted by hinge pins are formed on the middle portion and rear end portion of each of the support frames, respectively.

6. The seat position adjusting device of claim 4, wherein the moving rail, the middle link, the rear link, and each of the support frames are configured to form a four-point articulation link while being connected to each other.

7. The seat position adjusting device of claim 1, wherein a manual operation mechanism for locking and unlocking operations, and forward/backward operation of the moving rail is mounted on the fixed rail and the moving rail.

8. The seat position adjusting device of claim 7, wherein the manual operation mechanism comprises:
- a hinge bracket mounted on the moving rail;
- a locking member rotatably mounted on the hinge bracket and selectively inserted into one of a plurality of locking holes formed in the fixed rail so as to lock the moving rail; and
- a manual operation bar of a predetermined length connected to the locking member to rotate the locking member in a locking or unlocking direction.

9. The seat position adjusting device of claim 1, wherein when the moving rail is moved to the front of the fixed rail, the support links rotate to be inclined forward, and at the same time, the seat cushion frame and the seatback frame are rotated to be inclined backward around a hinge fastening point with the front link.

10. The seat position adjusting device of claim 1, wherein when the moving rail is moved to the rear of the fixed rail, the support links rotate to be inclined backward, and at the same time, the seat cushion frame and the seatback frame are rotated to erect forward around a hinge fastening point with the front link.

* * * * *